United States Patent
Mostafa

(10) Patent No.: US 9,727,436 B2
(45) Date of Patent: Aug. 8, 2017

(54) ADDING A PROFILING AGENT TO A VIRTUAL MACHINE TO PERMIT PERFORMANCE AND MEMORY CONSUMPTION ANALYSIS WITHIN UNIT TESTS

(75) Inventor: Mohammed Mostafa, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 1852 days.

(21) Appl. No.: 11/968,351

(22) Filed: Jan. 2, 2008

(65) Prior Publication Data

US 2009/0172664 A1 Jul. 2, 2009

(51) Int. Cl.
| | |
|---|---|
| *G06F 9/44* | (2006.01) |
| *G06F 11/30* | (2006.01) |
| *G06F 11/34* | (2006.01) |
| *G06F 9/455* | (2006.01) |
| *G06F 11/36* | (2006.01) |

(52) U.S. Cl.
CPC ...... *G06F 11/3089* (2013.01); *G06F 9/45504* (2013.01); *G06F 11/301* (2013.01); *G06F 11/3037* (2013.01); *G06F 11/3409* (2013.01); *G06F 11/3419* (2013.01); *G06F 11/3438* (2013.01); *G06F 11/3466* (2013.01); *G06F 11/3476* (2013.01); *G06F 11/3612* (2013.01); *G06F 2201/815* (2013.01); *G06F 2201/865* (2013.01); *G06F 2201/88* (2013.01)

(58) Field of Classification Search
None
See application file for complete search history.

(56) References Cited

U.S. PATENT DOCUMENTS

| | | | | |
|---|---|---|---|---|
| 7,086,064 | B1* | 8/2006 | Stevens | 719/310 |
| 7,185,367 | B2* | 2/2007 | Munson | 726/23 |
| 7,266,808 | B2* | 9/2007 | Kolawa et al. | 717/126 |
| 7,293,260 | B1* | 11/2007 | Dmitriev | 717/130 |
| 7,620,856 | B2* | 11/2009 | Kagan et al. | 714/57 |

(Continued)

OTHER PUBLICATIONS

Viswanathan et al., "Java Virtual Machine Profiler Interface", 2000, IBM Systems Journal vol. 39, No. 1.*

(Continued)

*Primary Examiner* — Lewis A Bullock, Jr.
*Assistant Examiner* — Mark Gooray
(74) *Attorney, Agent, or Firm* — George R. McGuire; Bond Schoeneck & King, PLLC; John Pivnichny

(57) ABSTRACT

The present invention discloses a solution for adding a profiling agent to a virtual machine (VM), which permits unit test programs to access information relating to memory and performance from runtime data areas of the VM. Operations permitted by the agent can include starting/stopping VM monitor, getting objects from the heap, retrieving an invocation count, determining a size of an instantiated object, getting a current thread time, and the like. Memory and performance information gathered during a test can be stored for later analysis under a test version identifier. A comparison engine can create reports that use the stored performance and memory data, which can help developers compare memory/performance deltas among different unit versions. In one embodiment, the VM can be a JAVA VIRTUAL MACHINE (JVM) and the unit test programs can be JUNIT programs.

8 Claims, 4 Drawing Sheets

(56) References Cited

U.S. PATENT DOCUMENTS

| | | | |
|---|---|---|---|
| 7,721,154 B1* | 5/2010 | Jaamour et al. | 714/38.14 |
| 7,793,269 B2* | 9/2010 | Singonahalli et al. | 717/131 |
| 7,908,590 B1* | 3/2011 | Min et al. | 717/124 |
| 2003/0105777 A1* | 6/2003 | Seidl et al. | 707/200 |
| 2004/0133895 A1* | 7/2004 | Dahlstedt et al. | 719/310 |
| 2005/0114844 A1* | 5/2005 | Betancourt et al. | 717/128 |
| 2005/0204342 A1* | 9/2005 | Broussard | 717/124 |
| 2005/0223362 A1* | 10/2005 | Whitlock et al. | 717/126 |
| 2005/0240641 A1* | 10/2005 | Kimura et al. | 707/206 |
| 2006/0085156 A1* | 4/2006 | Kolawa et al. | 702/119 |
| 2006/0195823 A1* | 8/2006 | Bentolila | 717/127 |
| 2006/0206885 A1* | 9/2006 | Seidman et al. | 717/148 |
| 2006/0247907 A1* | 11/2006 | Qadeer et al. | 703/22 |
| 2006/0277440 A1* | 12/2006 | Minshall et al. | 714/38 |
| 2007/0074170 A1* | 3/2007 | Rossmann | G06F 11/3466 717/127 |
| 2007/0083854 A1* | 4/2007 | Mayer-Ullmann et al. | 717/124 |
| 2007/0185984 A1* | 8/2007 | Roth | 709/223 |
| 2008/0244525 A1* | 10/2008 | Khalil et al. | 717/124 |
| 2008/0244546 A1* | 10/2008 | Schmelter et al. | 717/158 |
| 2009/0125891 A1* | 5/2009 | Garimella | G06F 11/3688 717/131 |

OTHER PUBLICATIONS

Gamma et al., "JUnit: A Cook's Tour", 2002, http://www.computing.dcu.ie/~renaat/ca421/cookstour.htm.*

* cited by examiner

| <<JAVA Class>> 510 MemoryTestCase |
|---|
| • start () |
| • stop () |
| •ˢ assertNoInstancesInHeap () |
| •ˢ getHeapSize () |
| •ˢ getInstancesCount () |
| •ˢ assertInstancesCount () |
| •ˢ getShallowSize () |
| •ˢ assertInstancesShallowSize () |

| <<JAVA Class>> 520 PerformanceTestCase |
|---|
| •ˢ getMethodInvocationCount () |
| •ˢ assertMethodInvocationCount () |
| •ˢ assertMethodInvocationCountNative () |

| | | | 610 |
|---|---|---|---|
| Differences Report | | | |

Changes

| ClassName | MethodName | MethodSignature | CallCount |
|---|---|---|---|
| com.ibm.jvm.Util | isRealTime | ()Z | -2 |
| com.ibm.jvm.io.ConsolePrintStream | getNewlinedString | (Ljava/lang/Object;)Ljava/lang/String; | -3 |
| com.ibm.jvm.io.ConsolePrintStream | getNewlinedString | (Ljava/lang/Object;Z)Ljava/lang/String; | -3 |
| com.ibm.jvm.io.ConsolePrintStream | Println | (Ljava/lang/Object;)V | -3 |
| Org.osgi.framework.BundleEvent | getBundle | ()Lorg/osgi/framework/Bundle; | -1 |
| Org.osgi.framework.BundleEvent | getType | ()I | 6 |

Deletes

| ClassName | MethodName | MethodSignature |
|---|---|---|
| Testing.popup.actionsTestMemoryLeak | DisplayObjectsOfSpecificTypeInHeap | (II)V |

FIG. 6

ADDING A PROFILING AGENT TO A VIRTUAL MACHINE TO PERMIT PERFORMANCE AND MEMORY CONSUMPTION ANALYSIS WITHIN UNIT TESTS

BACKGROUND

Field of the Invention

The present invention relates to the field of unit testing of virtual machine components and, more particularly, to adding a profiling agent to a virtual machine to permit performance and memory consumption analysis within unit tests.

Description of the Related Art

A number of languages, like JUNIT, exist expressly for conducting unit tests of software units configured to execute within a virtual machine environment, such as a JAVA VIRTUAL MACHINE (JVM). Unit testing can be valuable as it permits one or more software units to be tested throughout a software development cycle by simply executing a unit test program. When a software unit requires iterative testing during its lifecycle, an initial cost of constructing a unit test program can be considerably outweighed with long term savings gained throughout the software development cycle.

Black and white box testing of units using unit tests generally don't include tests for memory usage and/or performance. This is expressed in the JUNIT language by a lack of memory and/or performance related asserts. When unit tests include memory and/or performance checks, results are often less than perfect and writing the testing code can be challenging. Executing unit tests for memory and performance related information is difficult because needed information from a virtual machine is not currently exposed. For example, in the JUNIT API, there is no API access to the heap, there is no access to object size, there is no memory specific asserts, and there is no control over a garbage collector. Additionally, no information is available to access thread specific timers, to query a method invocation count, and no performance related asserts exist.

SUMMARY OF THE INVENTION

The present invention discloses a solution for adding a profiling agent to a virtual machine, which permits unit test programs to access information relating to memory and performance from runtime data areas of the virtual machine (VM). Operations permitted by the agent can include starting/stopping VM monitor, getting objects from the heap, retrieving an invocation count, determining a size of an instantiated object, getting a current thread time, and the like. Memory and performance information gathered during a test can be stored for later analysis under a test version identifier. A comparison engine can create reports that use the stored performance and memory data, which can help developers compare memory/performance deltas among different unit versions. In one embodiment, the VM can be a JAVA VIRTUAL MACHINE (JVM) and the unit test programs can be JUNIT programs. Further, JUNIT can be extended to include one or more asserts related to memory and/or performance information exposes through the agent.

The present invention can be implemented in accordance with numerous aspects consistent with material presented herein. For example, one aspect of the present invention can include a system for performing unit testing that includes a virtual machine, a profiling agent, and a unit testing framework. The virtual machine can be configured to execute software units. The unit testing framework can be configured to test software units executing within the virtual machine. The profiling agent can be an agent of the virtual machine that exposes memory and performance information from runtime data areas of the virtual machine to the unit testing framework, which would not otherwise be exposed. The unit testing framework can execute a set of methods relating to memory and performance of the runtime data areas, where the set of methods interact with the profiling agent.

Another aspect of the present invention can include an extension to a unit testing framework that includes a set of published methods available for unit testing purposes relating to memory and/or performance aspects of an application virtual machine. These memory and performance aspects can be gathered from runtime data areas of the application virtual machine by a profiling agent. The published methods can include any or all of the following: a get heap method, a get invocation count method, a get size of object method, a get current thread time method, and a get data model method.

Still another aspect of the present invention can include a method for exposing runtime data areas of a virtual machine to a unit testing framework. The method can include a step of placing a profiling agent within an application virtual machine that has access to runtime data areas of the application virtual machine. An interface class can be established for exchanging information with the profiling agent. The interface class can include a set of public methods available to a unit testing framework. The public methods can provide memory and performance related information concerning objects in a heap of the application virtual machine and threads executing within the application virtual machine.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

FIG. 6 shows a sample differences report able to be generated by comparing differences between different unit tests of a common software object executing in a VM in accordance with an embodiment of the inventive arrangements disclosed herein.

DETAILED DESCRIPTION OF THE INVENTION

Figure 1:
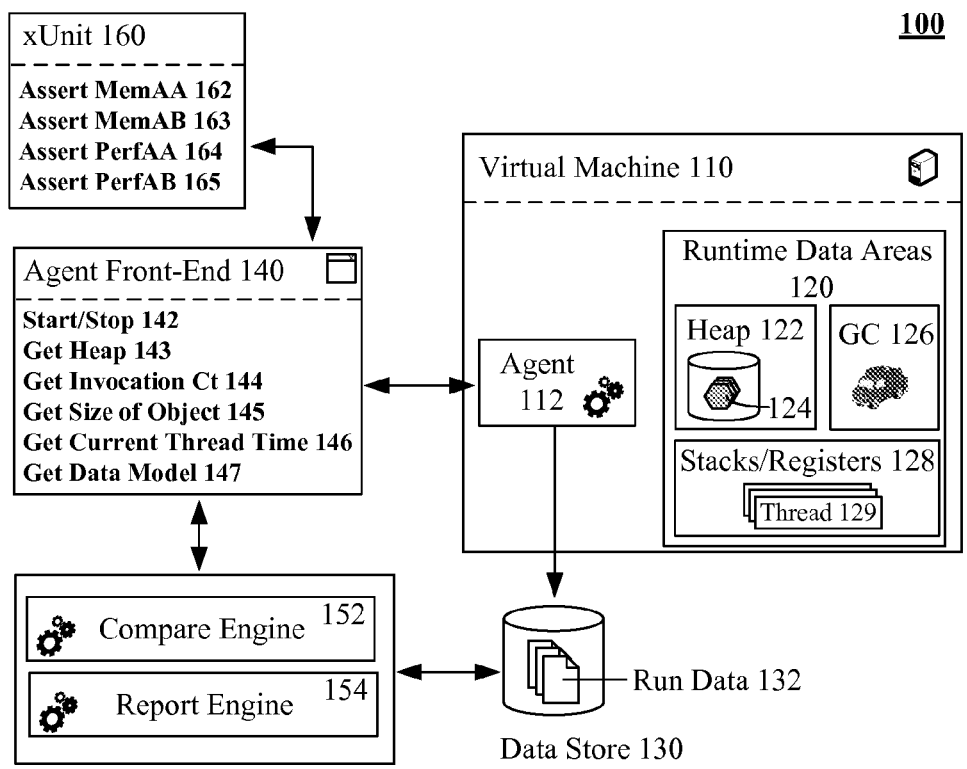
FIG. 1 is a schematic diagram illustrating a system that uses a profiling agent to expose memory and performance information of a virtual machine (VM) to a test unit framework in accordance with an embodiment of the inventive arrangements disclosed herein.

FIG. 1 is a schematic diagram illustrating a system 100 that uses a profiling agent 112 to expose memory and performance information of a virtual machine (VM) 110 to a test unit framework in accordance with an embodiment of the inventive arrangements disclosed herein. The profiling agent 112 can access information from runtime data areas 120 of the VM 110, such as a heap 122 and objects 124 contained therein. The agent 112 can either trigger a garbage collector 126 to perform collection actions or can prevent normally occurring actions from executing. Additionally, the agent 112 can access thread information 129 from stacks and/or registers 128 of the VM 100. All of this information is made available to an agent front end 140, which can be an interface class in an object oriented implementation of system 100.

The agent front-end 140 can include a plurality of public methods for obtaining information from the runtime data areas 120 and for initiating actions involving the runtime data areas 120. These methods can include, but are not limited to, start/stop methods 142, a get heap method 143, a get invocation count 144 method, a get size of object 145 method, a get current thread time 146 method, a get data model 147 method, and the like. Each of the methods 142-147 can be public methods able to be accessed from within xUnit 160 framework.

The start/stop 142 methods can start/stop a monitoring of memory and/or performance involving agent 112. Get heap 143 can force the garbage collector 126 to start and can then give access to all objects 124 in the heap 122. Get invocation count 144 can return how many times a specific method has been called during a monitoring period. One implementation of get size of object 145 can return a shallow size of an object 124. This result can depend upon the virtual machine 110 and the operating system. A different implementation of get size of object 145 can return a retained size of a specified object 124. Get current thread time 146 can return a current thread CPU time. Get data model 147 can return a set of optionally processed run data 132 from the data store 130.

Each time a unit test program is run, the agent 112 can monitor memory and/or performance. This information can be stored within data store 130 as run data 132 along with a run version identifier. A compare engine 152 can be a software engine that compares data collected across different runs 132. A report engine 154 can generate customizable reports based upon results of the compare engine 152. In one embodiment, a data model can be established that represents a set of collected data for a run as well as deltas between that run and one or more previous runs for past versions of the tested unit.

In addition to being able to execute the exposed methods 142-147, the xUnit 160 framework can be extended to include one or more asserts 162-165 that are related to memory and/or performance of the virtual machine 110. These asserts 162-165 can depend upon actions performed by and data provided by the agent 112.

In system 100, the VM 110 can be a process VM or an application VM, which runs as a normal application inside an operating system and that supports a single process. The VM 110 can provide a platform independent programming environment that abstracts away details of the underlying hardware/OS and that permits programs written for the VM 110 to execute in the same way on any platform. The VM 110 can include a JAVA VIRTUAL MACHINE, a COMMON LANGUAGE RUNTIME from the .NET FRAMEWORK, and the like.

The xUnit 160 is a code-driven testing framework, which can include test fixtures, test suites, and test execution. xUnit 160 includes JUNIT as well as other sUnit based language ports, such as PHPUnit, NUnit, PyUnit, fUnit, Test::Class, Test::Unit, CPPUnit, and the like.

Figure 2:
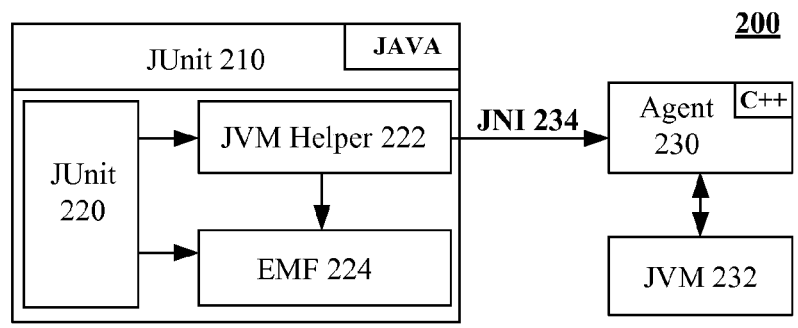
FIG. 2 is a schematic diagram of an implementation for an agent that exposes virtual machine information to a unit testing framework.

FIG. 2 is a schematic diagram 200 of an implementation for an agent that exposes virtual machine information to a unit testing framework. Specifically, diagram 200 presents an implementation for JUNIT based testing of software units within a JAVA VIRTUAL MACHINE 232. Diagram 200 represents one contemplated implementation of system 100.

In diagram 200, the profiling agent 230 can be written using a C++ programming language, which can include builds for various operating system platforms, such as WIN32, WIN64, LINUX, etc. The agent 230 can be a JVM profiling interface (JVMPI) agent, a JVM tooling interface (JVMTI) agent, and the like. The agent 230 can communicate with the JVM 232, which exposes some of its internal functionality specific to memory and performance analysis.

The JVM Helper 222 can be a JAVA interface for the C++ agent 230 that enables data to be exchanged between the JAVA and the C++ interfaces. API's for the JVM Helper 222 can include the methods analogous to methods 142-147 detailed in system 100. Helper can use a Java Native Interface (JNI) 234 to communicate with agent 230.

An Eclipse Modeling Framework (EMF) 224 can communicate with JUNIT 220 and the JVM helper 222. THE EMF 224 can include a data model that represents collected data model and the delta model to support comparing data collected across different runs. The EMF 224 model can include a compare engine, which accepts data roots and products a delta model that represents the differences.

Figure 3:
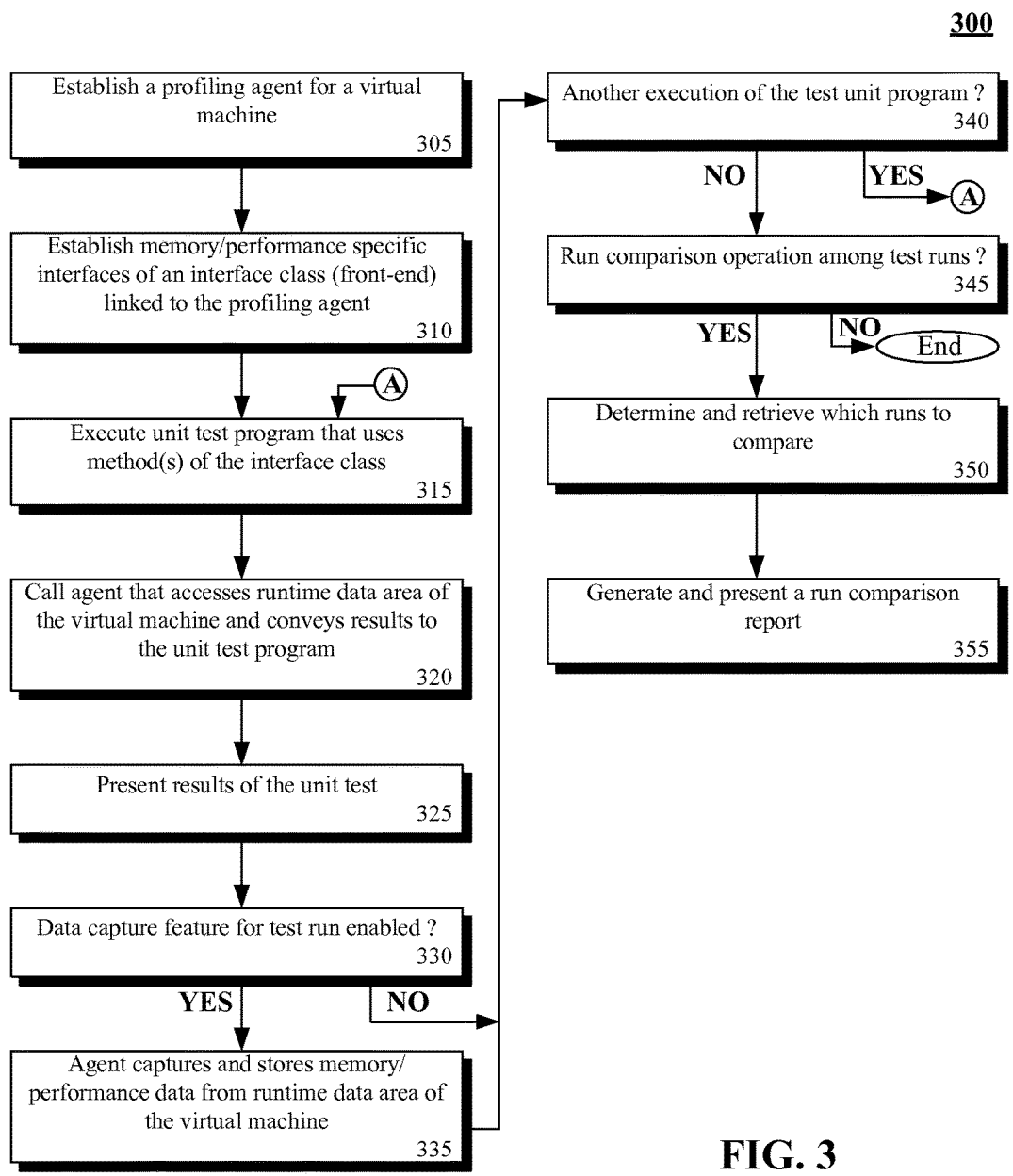
FIG. 3 is a flow chart showing a method in which a profiling agent is able to expose memory and performance information concerning a VM to unit test programs in accordance with an embodiment of the inventive arrangements disclosed herein.

FIG. 3 is a flow chart showing a method 300 in which a profiling agent is able to expose memory and performance information concerning a VM to unit test programs in accordance with an embodiment of the inventive arrangements disclosed herein. The method 300 can be performed in the context of a system 100 or 200.

Method 300 can begin in step 305, where a profiling agent for a VM can be established. In step 310, memory/performance specific interfaces can be established using an interface front end linked to the profiling agent. The front-end can, for example, be an interface class that exposes memory and performance related methods to a test framework. In step 315, a unit test program can execute while the agent is monitoring performance/memory aspects of the VM. The unit test program can include one or more method calls to a memory/performance related method, as shown by step 320. The agent can access a runtime data area of the VM and can convey results to the unit test program and/or perform programmatic actions initiated by the unit test program. In step 325, results of the unit test can be presented.

In step 330, a determination can be made as to whether a data capture feature for the test run was enabled. If so, the profiling agent can store all captured memory/performance data related to the test, as shown by step 335. In step 340, a determination can be made as to whether another run of the test program is to be executed. When so, the method can progress from step 340 to step 315 where the unit test program can again execute. This execution can be for a different or for the same version of unit software. In step 345, an option can be provided to compare one or more runs, which can include a newly executed run. If no comparison is opted for, the method can end. Otherwise, the method can progress from step 345 to step 350, where two or more runs can be identified and retrieved from a storage area, such as the storage area where data from step 335 was stored. In step 355, a run comparison report based upon the retrieved data can be generated and presented to a requester.

Figures 4, 5:
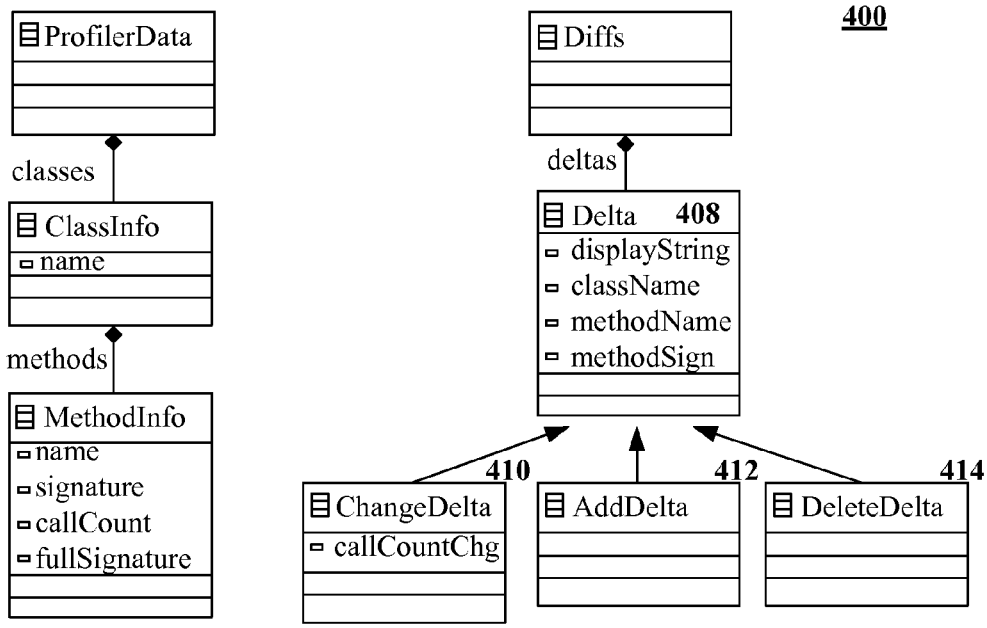
FIG. 4 is a schematic for a sample model class diagram, such as a model conforming to an ECLIPSE MODEL FRAMEWORK (EMF) data model as described in FIG. 2.
FIG. 5 shows JUNIT extensions for memory and performance in accordance with an embodiment of the inventive arrangements disclosed herein.

FIG. 4 is a schematic for a sample model class diagram 400, such as a model conforming to an ECLIPSE MODEL FRAMEWORK (EMF) data model as described in system 200. The supported deltas 408 shown in model 400 include an add delta 412, a delete delta 414, and a change delta 410.

Model specifics are variable by implementation and diagram 400 is presented to illustrate a concept. The scope of the disclosed invention is not to be limited by specifics shown in diagram 400 in any manner since the disclosed invention is able to utilize any model and not just that detailed in diagram 400.

FIG. 5 shows JUNIT extensions for memory 510 and performance 520 in accordance with an embodiment of the inventive arrangements disclosed herein.

FIG. 6 shows a sample differences report 610 able to be generated by comparing differences between different unit tests of a common software object executing in a VM in accordance with an embodiment of the inventive arrangements disclosed herein. In one embodiment, the report 610 can represent an HTML report that has been generated from a delta data model (i.e., one of the EMF data models expressed in diagram 400)

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A system for performing unit testing comprising:
a virtual machine configured to execute software units, wherein said virtual machine is a JAVA VIRTUAL MACHINE:
a unit testing framework comprising at least one assert relating to memory and performance of runtime data areas of the virtual machine, the unit testing framework configured to test the software units executing within the virtual machine using the at least one assert, wherein said unit testing framework is JUNIT:
a data store;
a JAVA interface class located outside the virtual machine and comprising a set of methods relating to memory and performance of the runtime data areas, wherein said set of methods comprises a get heap method, a get invocation count method, a get size of object method, a get current thread time method, and a get data model method;
a profiling agent placed within the virtual machine configured to: access runtime data areas of the virtual machine; expose memory and performance information from runtime data areas of the virtual machine to the unit testing framework, wherein said unit testing framework is able to execute said set of methods relating to memory and performance of the runtime data areas, wherein said set of methods interact with the profiling agent; and capture, and store in said data store, memory and performance data for different test runs associated with one of the software units, wherein the different runs correspond to different versions of the associated software unit, wherein said agent is written in C++, and wherein a JAVA NATIVE INTERFACE (JNI) is used to exchange data between the JAVA interface class and the profiling agent:
a comparison engine configured to be executed by a computer processor, wherein the comparison engine is configured to: retrieve from said data store two or more test runs each comprising memory and performance data corresponding to a version of the associated software unit; and compare the memory and performance data from the two or more test runs;
an ECLIPSE MODEL FRAMEWORK (EMF) data model configured to represent data collected by the profiling agent for at least one of the different test runs and configured to represent a delta model that supports comparing data collected across at least two of the different test runs; and
a reporting engine configured to be executed by a computer processor, wherein the reporting engine is configured to report the comparison from the comparison engine.

2. The system of claim 1, wherein the profiling agent is one of a JAVA VIRTUAL MACHINE PROFILER INTERFACE (JVMPI) agent and a JAVA VIRTUAL MACHINE TOOLING INTERFACE (JVMTI).

3. The system of claim 1, wherein said the at least one assert is provided an extension to the unit testing framework, wherein the extension uses information from the profiling agent.

4. The system of claim 1, wherein the virtual machine is an application virtual machine comprising a heap for objects that are garbage collected and a set of stacks and registers for threads, wherein a standard Application Program Interface (API) for the application virtual machine fails to expose the memory and performance information exposed by the profiling agent to the unit testing framework.

5. The system of claim 4, wherein said memory information exposed by the profiling agent comprises information concerning which objects are in the heap.

6. The system of claim 4, wherein one of said methods permits a memory size of a selected object in the heap to be queried.

7. The system of claim 4, wherein said performance information exposed by the profiling agent comprises timing information concerning the threads.

8. A method for exposing runtime data areas of a virtual machine to a unit testing framework, the method comprising:

provustnig a profiling agent within an application virtual machine that has access to runtime data areas of the application virtual machine, wherein said application virtual machine is a JAVA VIRTUAL MACHINE, and wherein said unit testing framework is JUNIT, and further wherein said agent is written in C++, and establishing a JAVA interface class located outside the virtual machine for exchanging information with the profiling agent, wherein said interface class includes a plurality of public methods for unit testing a software unit, wherein said public methods provide memory and performance related information concerning objects in a heap of the application virtual machine and threads executing within the application virtual machine, wherein a standard Application Program Interface (API) for the application virtual machine fails to expose runtime data areas exposed by the profiling agent to the unit testing framework, wherein said plurality of public methods comprise a get heap method, a get invocation count method, a get size of object method, a get current thread time method, and a get data model method, and wherein a JAVA NATIVE INTERFACE (JNI) is used to exchange data between the JAVA interface class and the profiling agent;

accessing, by the profiling agent, runtime data areas of the virtual machine during a unit test of a software unit;

capturing, and storing in a data store, information about the unit test of the software unit;

retrieving from said data store information about two or more unit tests;

comparing the retrieved information about two or more unit tests to generate comparison data;

generating a data model configured to represent data collected by the profiling agent for at least one of the different test runs and configured to represent a delta model that supports comparing data collected across at least two of the different test runs; and generating a report using said comparison data.

* * * * *